United States Patent [19]

Gardner

[11] Patent Number: 4,945,792
[45] Date of Patent: Aug. 7, 1990

[54] BORING TOOL FOR MACHINING THE INTERIOR OF NARROW NECK CASING

[75] Inventor: Richard E. Gardner, Houston, Tex.

[73] Assignee: Cameron Iron Works USA, Inc., Houston, Tex.

[21] Appl. No.: 146,404

[22] Filed: Jan. 21, 1988

[51] Int. Cl.$^5$ ............................................. B23B 41/00
[52] U.S. Cl. ........................................ 82/1.2; 82/1.4; 82/1.5
[58] Field of Search ................ 82/1.2 R, 1.5 R, 1.4 R, 82/1.3

[56] References Cited

U.S. PATENT DOCUMENTS 1,750,392  6/1988  Hong ..................................... 82/1.5
2,040,761  5/1936  Rothschmitt .......................... 82/1.5

FOREIGN PATENT DOCUMENTS 0256475  8/1970  U.S.S.R. ................................ 82/1.5

Primary Examiner—Frederick R. Schmidt
Assistant Examiner—Lawrence Cruz

[57] ABSTRACT

An improved boring tool with a hollow boring bar and has an exterior semicircular surface and an opposite eliptical surface over a substantial portion of its length and has a circular slotted end portion, the diameter of which is sufficiently small to pass through the neck opening in the workpiece whose interior is to be machined, a piston having its rod extending through the boring bar and connecting to a linkage which also connects to a tool holder which is pivotally mounted to the enlarged slotted end of the boring bar so that the tool holder may be pivoted to position the tool secured to the tool holder for the boring of the arcuate interior surface immediately inside the neck of the workpiece responsive to axial and radial movement of the boring bar in the opening of the neck.

3 Claims, 6 Drawing Sheets

BORING TOOL FOR MACHINING THE INTERIOR OF NARROW NECK CASING

BACKGROUND

The present invention relates to an improved boring tool which is suitable for machining the interior contour of a casing, such as containers or cylinders for storing a fluid under high pressures or a bomb casing, which has a single axial opening which is relatively small compared to the diameter of the casing interior which is to be machined.

Prior to the present invention the machining of the interior of such a casing with a narrow axial opening has been difficult, particularly the accurate machining of the arcuate interior immediately inside the opening.

U. S. Pat. No. 2,040,761 discloses a boring tool for machining the interior of cylinders in which the boring bar extends through the axial opening and includes a linkage which unfolds to cause the tool to pivot at the end of the boring bar outward and, through rotation of the cylinder, to cut the interior contour. The boring bar is substantially the same size as the axial opening and all movement of the boring bar is axial with all radial movement resulting from the piston operated pivoting or the cutting tool arm.

U. S. Pat. No. 3,418,884 discloses another cavity cutting machine having a tool arm mounted within the workpiece cavity with double acting pistons to control the movement of the tool arm and thus the shape of the cavity cut when the workpiece is rotated with the rotary table on which it is mounted.

U. S. Pat. No. 4,357,846 discloses a cutting tool which is designed to machine the interior of a hollow turbine shaft to eliminate any non-smooth contour which could cause a notch defect within the shaft. The tool is mounted on a rotating drive shaft and includes cam means for guiding the tool along curved trajectory.

U. S. Pat. No. 1.973,386 discloses a boring machine in which cutting tools are inserted into a hollow cylindrical container and are arranged to be driven to cut tapers or to cut a cylindrical interior surface.

U. S. Pat. No. 2,131,468 discloses a boring machine which is designed to cut tapers by utilizing a shaft mounted at an angle and a cutting tool at the end of the shaft mounted in offset position so that it is centered and will cut a preselected taper on the interior surface of the workpiece.

U. S. Pat. No. 2,517,738 discloses a taper boring head with a with a pivotally mounted arm and a cutter mounted on the arm. The taper is controlled by a system of gears, rack and pinion.

SUMMARY

The present invention relates to an improved boring tool in which the boring bar or arbor is hollow and has a shaft which has an exterior semicircular surface and an opposite eliptical surface over a substantial portion of its length and has a circular slotted end portion, the diameter of which is sufficiently small to pass through the neck opening in the workpiece whose interior is to be machined, a piston having its rod extending through the arbor and connecting to a linkage which also connects to a tool holder which is pivotally mounted to the enlarged slotted end of the boring bar so that the tool holder may be pivoted to position the tool secured to the tool holder for the boring of the arcuate interior surface immediately inside the neck of the workpiece responsive to radial and axial movement of the boring bar in the neck opening of the workpiece.

An object of the present invention is to provide an improved boring tool which can machine the interior surface of a hollow cylinder and through a neck opening which is substantially smaller than the maximum diameter to be machined.

Another object is to provide an improved boring tool which can machine the arcuate internal surface in a container with extreme accuracy so that the surface will have a requisite finish.

A further object is to provide an improved boring tool in which the boring bar is inserted into a hollow cylinder having a reduced neck through the neck opening and has a tool holder which can be manipulated to accurate machine the arcuate internal surface immediately inside the neck.

BRIEF DESCRIPTION OF THE DRAWINGS

These and other objects and advantages are hereinafter set forth and explained with respect to the drawings wherein.

DESCRIPTION OF THE PREFERRED EMBODIMENTS

Figure 7:
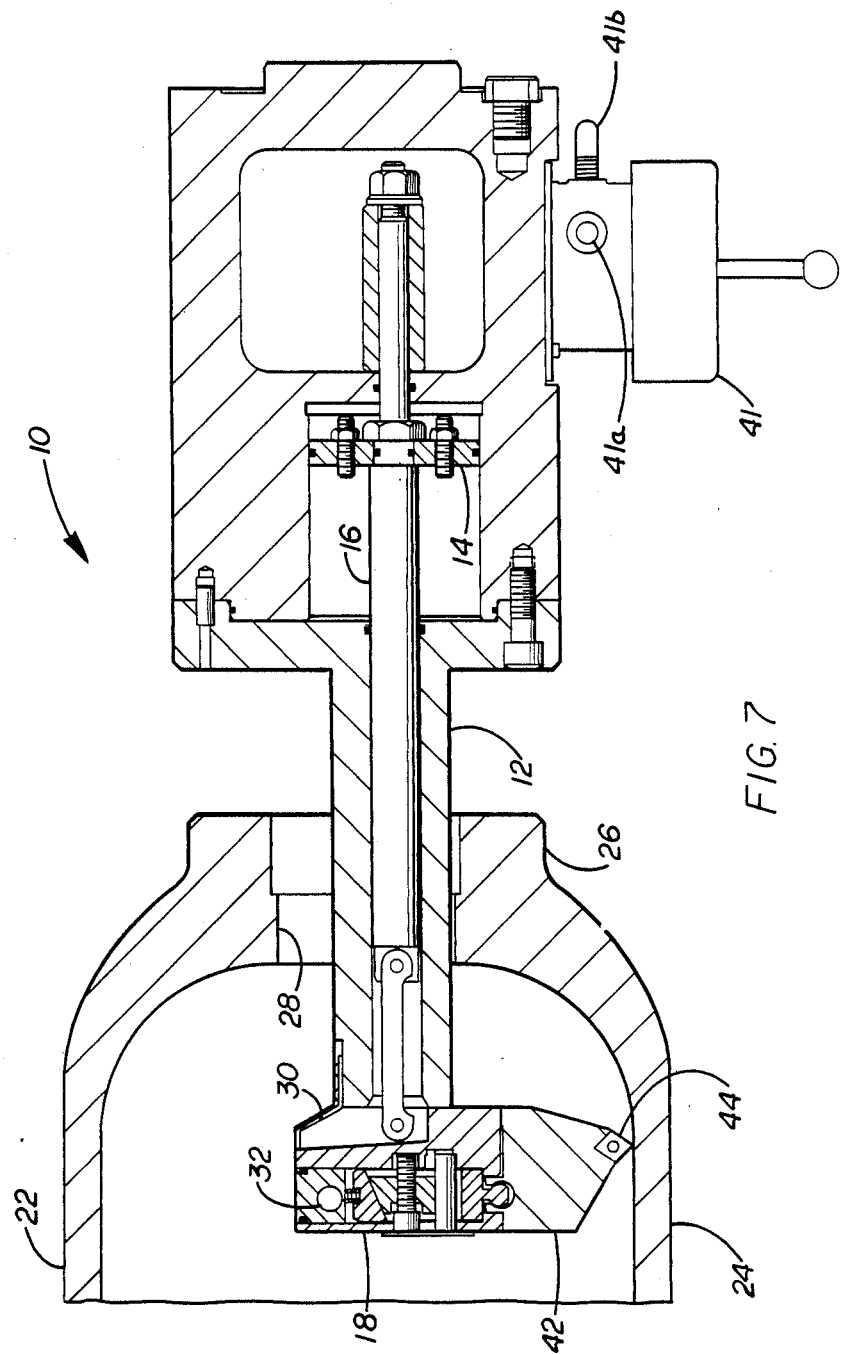
FIG. 7 is a detail sectional view of the improved boring tool of the present invention showing it in the cutting position.
Figure 8:
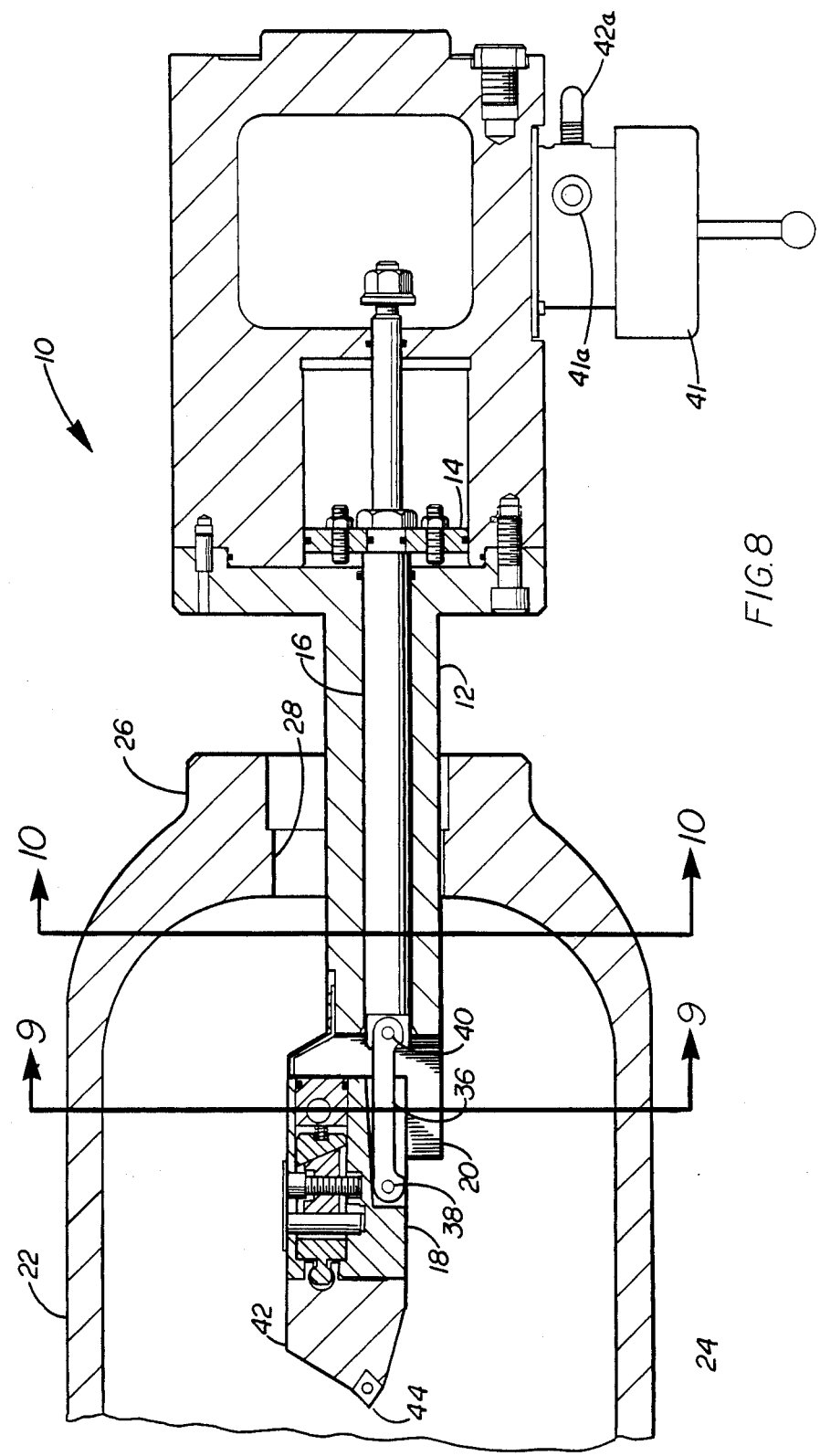
FIG. 8 is another detail sectional view similar to FIG. 7 showing the boring tool in its position ready for retraction from or upon completion of insertion into the container.

Improved boring tool 10 of the present invention is shown in the drawings and as best seen in FIGS. 7 and 8 includes hollow boring bar 12, actuator 14, actuator rod 16 extending from actuator 14 through bar 12 to tool block 18 which is pivotally mounted in slot 20 in the inner end of bar 12. Workpiece 22 is suitably mounted for rotation in the boring machine (not shown). Workpiece 22 is a hollow cylindrical body 24 with a neck 26 at one end and having small diameter opening 28 extending therethrough as compared to the internal diameter of body 24.

Figure 10:
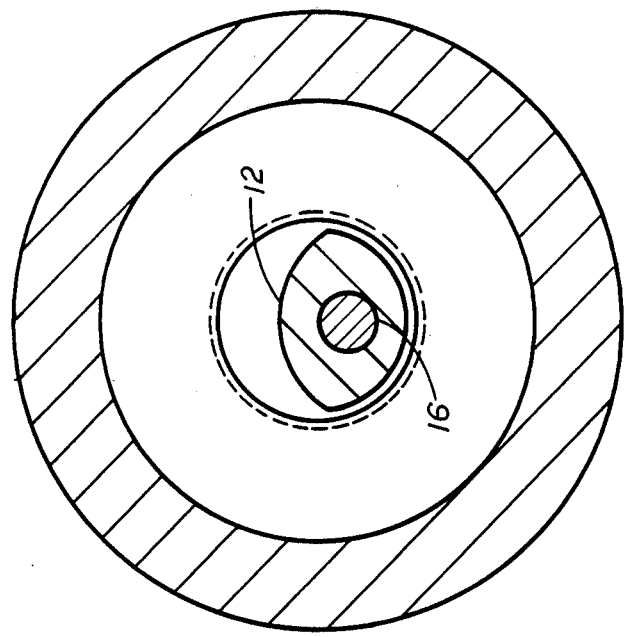
FIG. 10 is a sectional view taken along line 10—10 in FIG. 8 to illustrate the cross sectional shape of the boring bar.
Figure 9:
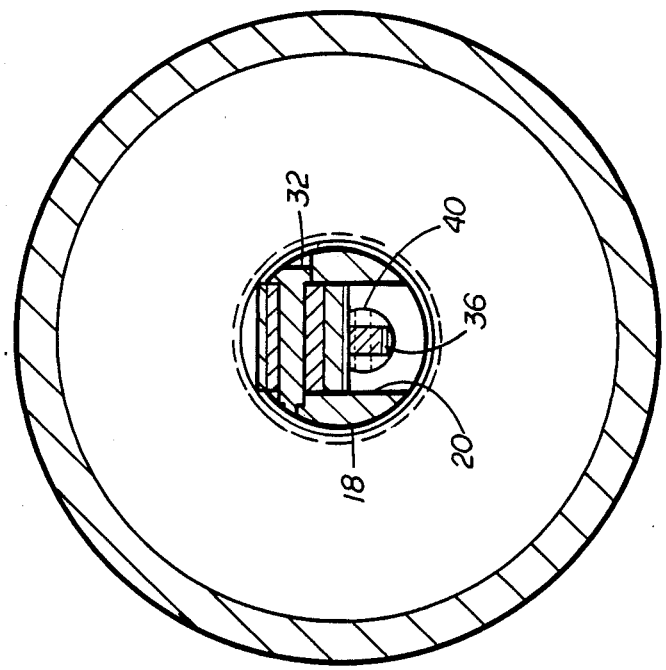
FIG. 9 is a sectional view taken along line 9—9 in FIG. 8 to illustrate the pivotal mounting of tool block in the boring rod.

As best seen in FIG. 10, boring bar 12 is round in section on its lower portion and flattened to an elliptical shape on its upper side so that its vertical dimension is less than the diameter of opening 28, thus allowing boring bar 12 to be moved vertically in opening 28 and also axially. The outer end of boring bar 12 is enlarged at 30 and slot 20 extends vertically through enlarged portion 30. Pin 32 extends through enlarged portion 30 of rod 12, through tool block 18 which is positioned within slot 20 and thus provides the pivotal mounting means for mounting tool block 18 within slot 20. Link 36 is connected to block 18 by pin 38 and to the end of actuator rod 16 by pin 40.

Control means 41 is provided to control the entry and exhausting of control fluid to the respective sides of actuator 14 so that actuator 14 can move from its retracted position as shown in FIG. 7 to its extended position as shown in FIG. 8. Fluid is conducted to and from control means 41 through connections 41a and 41b to and from a suitable source of fluid under pressure (not shown). When actuator 14 is in its extended position, block 18 is pivoted into a position in substantial alignment with boring bar 12 so that boring bar 12 with block 18 supported at its outer end can be inserted and withdrawn through opening 28. When actuator 14 is in its retracted position, block is pivoted into a position at substantially a right angle to boring bar 12 in position for the cutting steps as hereinafter described.

Cutting tool 42 having cutting element 44 secured therein is connected to block 18 by suitable means such as the clamping structure shown and sold by Sandvik Coromant Company. In the preferred form of the present invention three of the cutting tools are utilized (cutting tools 42, 42a and 42b). These tools 42 differ from each other by the variation of the positioning of the cutting elements 44, 44a and 44b in the cutting tools 42, 42a and 42b respectively to perform their individual functions as hereinafter described with respect to FIGS. 1 to 6.

Figure 1:
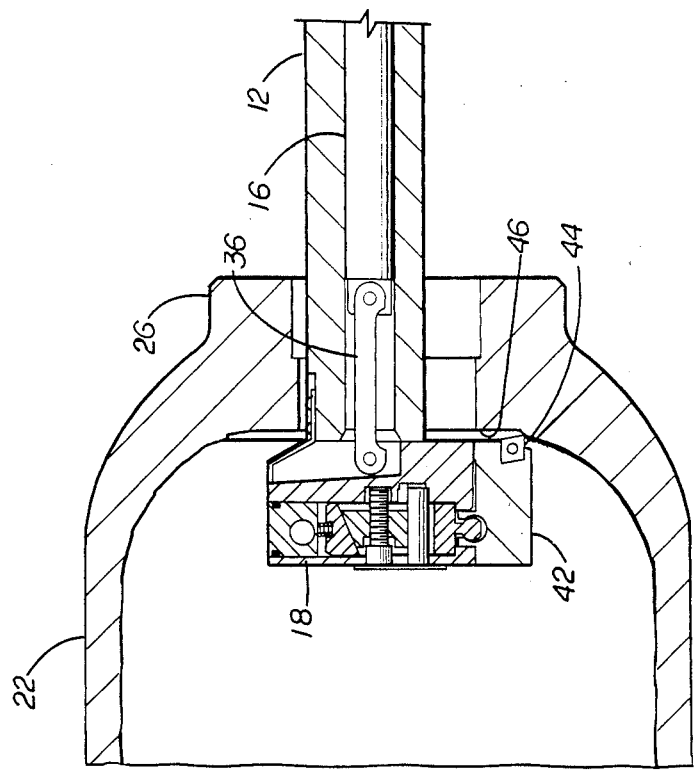
FIG. 1 is a sectional view through the container with the boring bar extending through the neck opening of the container and showing the cutting tool in its initial stages for cutting the arcuate internal portion of the container immediately inside the neck.
Figure 2:
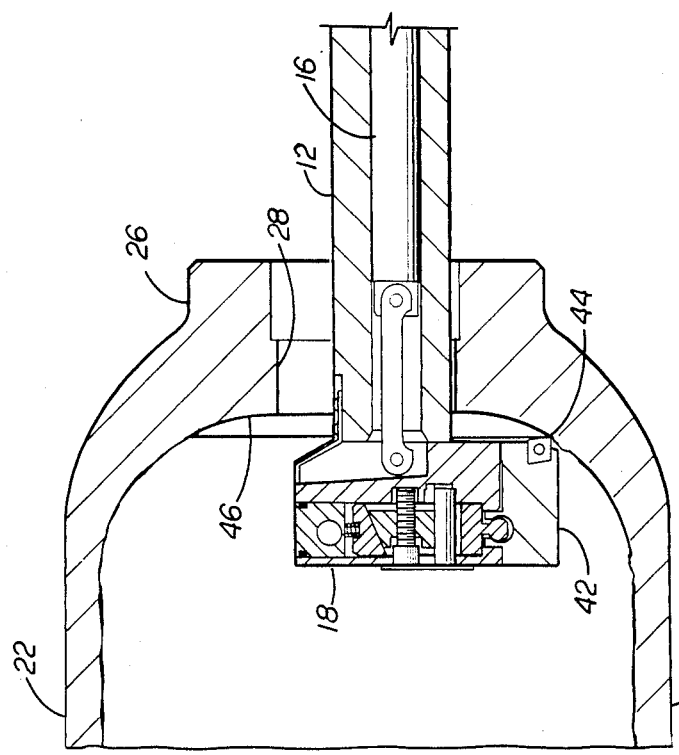
FIG. 2 is a similar view similar to FIG. 1 but showing the cutting tool at the end of its cutting movement.

When workpiece is ready for the machining of the interior contour leading from surface 46 immediately inside opening 28 to the internal surface which is continues from the arcuate contour made by the machining steps of the present invention, cutting tool 42 having cutting element 44 thereon is mounted in slot 30 in the end of boring bar 12 and actuator is extended to cause cutting tool and block 18 to be aligned with the axis of boring bar 12. Once block 18 is has passed through opening 28, actuator is retracted to bring block 18 to its pivoted cutting position as shown in FIG. 1. Boring bar 12 is moved to bring cutting element 44 into engagement with the interior of workpiece 22 at the start of its cutting stroke. In this position it should be noted that boring bar 12 is raised so that it is as high in opening 28 as possible. During the cutting by cutting element 44, boring bar 12 is moved both axially inward and downward so that cutting element 44 cuts the desired initial portion of the arcuate interior surface. The end of this cutting stroke is illustrated in FIG. 2.

Figure 3:
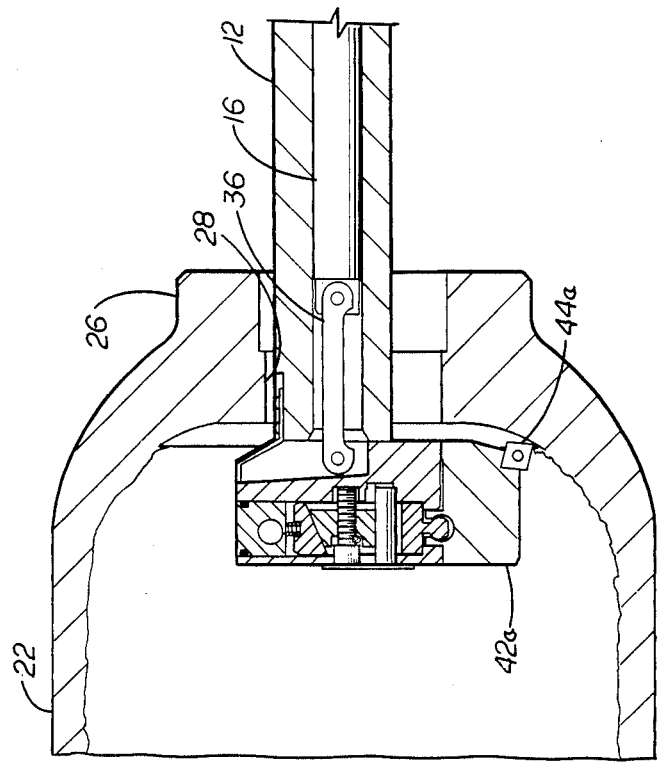
FIG. 3 is another similar view showing the second cutting tool as it commences its cutting on the interior of the container to continue the cutting started by the first cutting tool.
Figure 4:
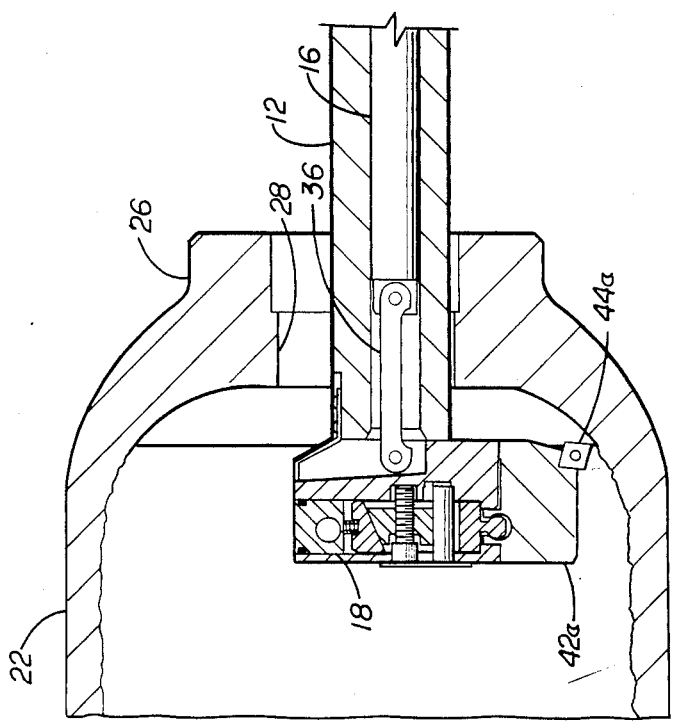
FIG. 4 is another similar sectional view showing the second cutting tool in its final position after completing its cutting movement.

At this point, actuator 14 is extended and boring bar 12 with cutting tool 42 thereon is withdrawn from the interior of workpiece 22. Cutting tool 42a is then mounted on block 18 and inserted through opening 28 and after retraction of actuator 14, cutting element 44a is positioned as shown in FIG. 3 at the initial point of its cutting stroke. The cutting stroke of cutting tool 42a is accomplished by the inward and downward movement of boring bar 12 as previously described. When cutting tool 42a has reached the end of its cutting stroke as shown in FIG. 4, actuator 14 is extended and boring bar 12 is withdrawn through opening 28.

Figure 5:
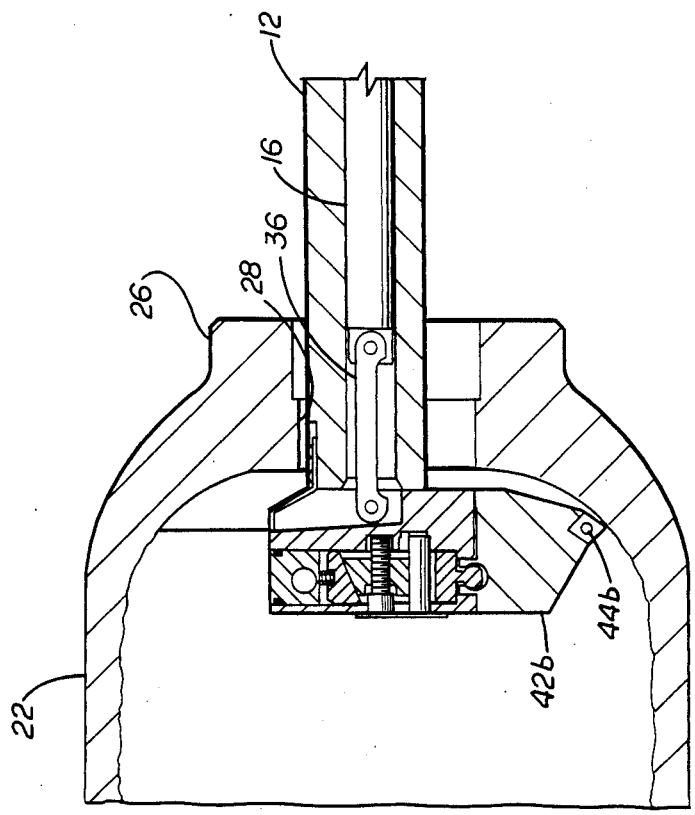
FIG. 5 is another similar view showing the third cutting tool as it commences its cutting on the interior of the container to continue the cutting of the second cutting tool.
Figure 6:
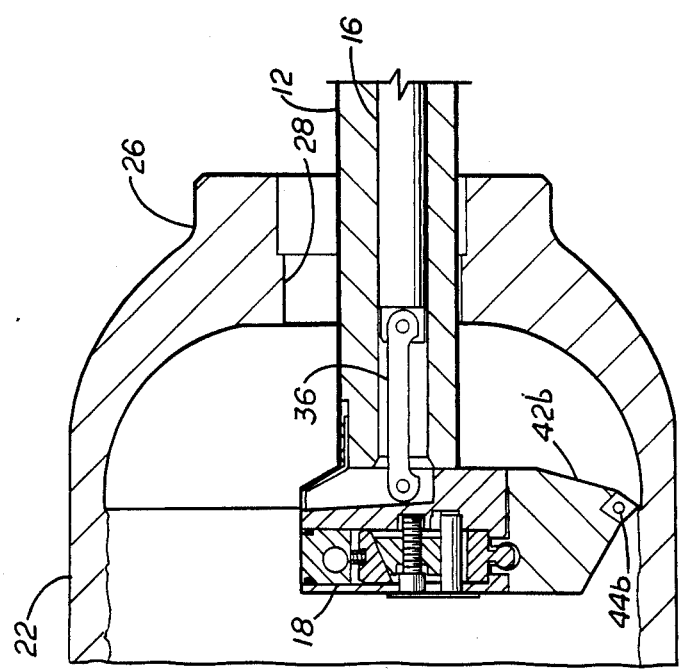
FIG. 6 is another similar view showing the third cutting tool in its final position after completing its cutting movement on the arcuate portion of the interior of the container.

Cutting tool 42a is removed and cutting tool 42b is installed in block 18. Block 18 with cutting tool 42b thereon and boring bar 12 are inserted through opening 28 and, after retraction of actuator 14, cutting element 44b is positioned at the beginning of its cutting stroke as shown in FIG. 5. Thereafter, the axial inward movement and downward movement of boring bar 12 and cutting tool 42b causes cutting element 44b to cut the interior of workpiece 22 to complete the arcuate surface 46 extending to the interior cylindrical surface of workpiece 22. This completion of its cutting stroke is illustrated in FIG. 6 and subsequently cutting tool 44b is removed therefrom through opening 28 as previously explained.

The interior cylindrical surface of workpiece 22 may be machined with any suitable tooling or by continuing use of cutting tool 42b with the provision that boring bar 12 must be sufficiently long to complete the machining of this surface.

As is apparent from the foregoing description, the improved device of the present invention can be used to machine many different types of interior contours by the proper selection of the cutting tool 42 and its cutting element 44 including, for example, such shapes as internal grooves, arcuate internal surfaces, internal straight surfaces and many other particular internal configurations not mentioned. These are made possible by the combined axial and radial movement of the boring bar 12 with respect to the neck of the workpiece through which it extends.

From the foregoing it can be seen that the improved boring tool of the present provides for the machining of substantially larger diameters than the diameter of the opening through which is it inserted and the machining of an arcuate surface immediately within the opening which does not rely on the pivoting of the cutting tool at the end of the boring bar during the machining stroke.

What is claimed is:

1. A boring tool for machining the interior of a workpiece having a neck at one end with a small end opening therethrough comprising a hollow boring bar having an enlarged portion on one end with a circular outer shape and a vertical slot therethrough and a remaining small portion of the boring bar having a smaller outer shape extending from the enlarged portion to the opposite end of the boring bar, an actuator mounted on the end of said boring bar opposite to the slotted end and having a connecting rod extending through the opening in the boring bar, a tool block pivotally mounted within the slot at the end of said boring bar, a cutting block having a cutting element secured thereto in preselected cutting position, mounting means for securing said cutting block on said tool block, a link pivotally connected to said tool block and to said actuator connecting rod whereby movement of the connecting rod toward said tool block causes said tool block to pivot into a position which is aligned with said boring bar and movement of the connecting rod away from said tool block cause said tool block to pivot into a cutting position with its cutting element in position to engage the interior surface of the workpiece, means for controlling flow of fluid under pressure to said actuator to cause the movement of the connecting rod away and toward the tool block to position the tool block with respect to the slotted end of the boring bar, the tool block and the enlarged end of the boring bar being sufficiently small to enter through the small end opening of a workpiece whose interior is to be machined, the remaining portion of the boring bar having a size and shape to allow it to move radially and axially in the small neck opening of the workpiece whose interior is to be machined.

2. A boring tool according to claim 1 wherein the smaller portion of the boring bar has a lower semicircular shape and an upper eliptical shape to allow the radial movement of the boring bar in the neck opening of the workpiece.

3. A boring tool according to claim 1 including a plurality of cutting blocks, each with a cutting element secured thereto in a different position from the other cutting blocks to provide a separate cutting block for cutting each portion of the arcuate interior of the workpiece.

* * * * *